(12) United States Patent
Hu

(10) Patent No.: US 9,952,728 B2
(45) Date of Patent: Apr. 24, 2018

(54) DEVICE AND METHOD FOR MEASURING CAPACITANCE DIFFERENCE

(71) Applicant: Touchplus Information Corp., New Taipei (TW)

(72) Inventor: Shih-Hsien Hu, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 258 days.

(21) Appl. No.: 14/982,814

(22) Filed: Dec. 29, 2015

(65) Prior Publication Data

US 2016/0188099 A1    Jun. 30, 2016

(30) Foreign Application Priority Data

Dec. 30, 2014    (CN) .......................... 2014 1 0840153

(51) Int. Cl.
   *G06F 3/044*        (2006.01)
   *G06F 3/041*        (2006.01)

(52) U.S. Cl.
   CPC ............ *G06F 3/044* (2013.01); *G06F 3/0416* (2013.01)

(58) Field of Classification Search
   CPC .......... G06F 3/044; G06F 3/0416; H03F 7/04; H03F 2200/123
   See application file for complete search history.

(56) References Cited

U.S. PATENT DOCUMENTS

2014/0333575 A1*  11/2014  Hu .......................... G06F 3/044
                                                       345/174
2015/0160762 A1    6/2015  Hu

FOREIGN PATENT DOCUMENTS

WO        2009/090534 A2    7/2009

\* cited by examiner

*Primary Examiner* — Michael Faragalla
*Assistant Examiner* — Chayce Bibbee
(74) *Attorney, Agent, or Firm* — WPAT, PC

(57) ABSTRACT

A driving signal is outputted to each of the first and second capacitors in a measurement period so that voltage changes occur at the first and second capacitors. First and second modulating voltage signals are provided for the first and the second capacitors in the measurement period. An output signal in a first state or a second state according to a voltage difference between the first and second capacitors is generated. One of the voltage values of the first and second modulating voltage is automatically adjusted according to the output signal. A characteristic value for indicating a capacitance difference between the first capacitor and the second capacitor, which correlates to a length of time from a start point of the measurement period to a specified point that a condition change of the output signal occurs or a slope of the first or second modulating voltage signal, is generated.

15 Claims, 10 Drawing Sheets

DEVICE AND METHOD FOR MEASURING CAPACITANCE DIFFERENCE

FIELD OF THE INVENTION

The present invention relates to device and method for measuring capacitance difference, and more particularly to device and method for measuring a capacitance difference used in a touch-sensing panel.

BACKGROUND OF THE INVENTION

A capacitive touch-sensing panel which locates a touch point by sensing a capacitance change on the panel has become a mainstream in the touch-sensing field. With increasing requirements on performance of a capacitive touch-sensing panel, e.g. capacitance-sensing speed, there are still some technical problems to be solved. A prior art, PCT Patent Publication WO2009/090534, discloses measurement of a capacitance difference by balancing capacitive impedance. In the prior art, however, it generally needs to adjust impedance combinations several times to make one capacitance measurement. The measuring means is inefficient and inflexible, and the capacitance-sensing speed is still unsatisfactory.

SUMMARY OF THE INVENTION

Therefore, the present invention provides a touch-sensing device and a touch-sensing method, in which a capacitance difference can be measured readily.

In a first aspect of the present invention, a device for measuring a capacitance difference between a first capacitor and a second capacitor comprises: a driving signal generator electrically connected to the first capacitor and the second capacitor for outputting a driving signal to each of the first capacitor and the second capacitor in a measurement period; a comparator having a first input terminal, a second input terminal and an output terminal, wherein the first input terminal and the second input terminal are electrically connected to the first capacitor and the second capacitor, respectively, and according to a voltage difference between the first input terminal and the second input terminal, an output signal, which is selectively switched between at least a first state and a second state, is outputted from the output terminal; and a modulating and measuring device coupled to the first input terminal, the second input terminal and the output terminal of the comparator, and generates a first modulating voltage signal and a second modulating voltage signal in the measurement period, wherein the first modulating voltage signal and the second modulating voltage signal are coupled to the first input terminal and the second input terminal, respectively, and selectively adjusted according to the output signal, and a characteristic value for indicating a capacitance difference between the first capacitor and the second capacitor is generated as correlating to a length of time from a start point of the measurement period to a specified point that a condition change of the output signal occurs.

In a second aspect of the present invention, a device for measuring a capacitance difference between a first capacitor and a second capacitor, comprises: a driving signal generator electrically connected to the first capacitor and the second capacitor for outputting a driving signal to each of the first capacitor and the second capacitor in a measurement period; a comparator having a first input terminal, a second input terminal and an output terminal, wherein the first input terminal and the second input terminal are electrically connected to the first capacitor and the second capacitor, respectively, and according to a voltage difference between the first input terminal and the second input terminal, an output signal, which is selectively switched between at least a first state and a second state, is outputted from the output terminal; and a modulating and measuring device coupled to the first input terminal, the second input terminal and the output terminal of the comparator, and generates a first modulating voltage signal and a second modulating voltage signal in the measurement period, wherein the first modulating voltage signal and the second modulating voltage signal are coupled to the first input terminal and the second input terminal, respectively, and selectively adjusted according to the output signal, and a characteristic value for indicating a capacitance difference between the first capacitor and the second capacitor is generated as correlating to a slope of the first modulating voltage signal or the second modulating signal, wherein the slope is defined as a voltage change of the first or second modulating voltage signal with time in the measurement period.

In a third aspect of the present invention, a method for measuring a capacitance difference between a first capacitor and a second capacitor, which is executed by a capacitance-difference measuring device, comprises: outputting a driving signal to each of the first capacitor and the second capacitor in a measurement period so that voltage changes occur at the first capacitor and the second capacitor; providing a first modulating voltage signal for the first capacitor and providing a second modulating voltage signal for the second capacitor in the measurement period, and generating an output signal in a first state or an output signal in a second state according to a voltage difference between the first capacitor and the second capacitor; and automatically selecting one of a voltage value of the first modulating voltage signal provided for the first capacitor and a voltage value of the second modulating voltage signal provided for the second capacitor to be adjusted according to the output signal, and generating a characteristic value for indicating a capacitance difference between the first capacitor and the second capacitor, which correlates to a length of time from a start point of the measurement period to a specified point that a condition change of the output signal occurs.

In an embodiment, a voltage value of the first modulating voltage signal is incrementally adjusted with selective one or more units of voltage per unit time when the output signal is in the first state, or a voltage value of the second modulating voltage signal is incrementally adjusted with selective one or more units of voltage per unit time when the output signal is in the second state, until a state change of the output signal occurs, and the characteristic value is the length of time from the start point of the measurement period to the specified point that the condition change of the output signal occurs, or the characteristic value is a ratio of the length of time to the measurement period.

In a fourth aspect of the present invention, a method for measuring a capacitance difference between a first capacitor and a second capacitor, which is executed by a capacitance-difference measuring device, comprises: outputting a driving signal to each of the first capacitor and the second capacitor in a measurement period so that voltage changes occur at the first capacitor and the second capacitor; providing a first modulating voltage signal for the first capacitor and providing a second modulating voltage signal for the second capacitor in the measurement period, and generating an output signal in a first state or an output signal in a second state according to a voltage difference between the first capacitor and the second capacitor; and automatically selecting one of a voltage value of the first modulating voltage signal provided for the first capacitor and a voltage value of the second modulating voltage signal provided for the second capacitor to be adjusted according to the output signal, and generating a characteristic value for indicating a capacitance difference between the first capacitor and the second capacitor, which correlates to a slope of the first modulating voltage signal or the second modulating signal, wherein the slope is defined as a voltage change of the first or second modulating voltage signal with time in the measurement period.

In an embodiment, a voltage value of the first modulating voltage signal is incrementally adjusted with selective one or more units of voltage per unit time when the output signal is in the first state, or a voltage value of the second modulating voltage signal is incrementally adjusted with selective one or more units of voltage per unit time when the output signal is in the second state, until a state change of the output signal occurs, and the characteristic value is a number of unit of voltage change that is added to the first modulating voltage signal or the second modulating voltage signal in the last unit time before the measurement period times up.

BRIEF DESCRIPTION OF THE DRAWINGS

The invention will become more readily apparent to those ordinarily skilled in the art after reviewing the following detailed description and accompanying drawings.

FIG. 2A is a schematic waveform diagram of a charging signal, which a measurement period used in a capacitance-difference measuring method according to an embodiment of the present invention is based on.

FIG. 2B is a schematic waveform diagram of a discharging signal, which a measurement period used in a capacitance-difference measuring method according to an embodiment of the present invention is based on.

DETAILED DESCRIPTION OF PREFERRED EMBODIMENTS

The invention hereinafter will be described in greater detail with preferred embodiments of the invention and accompanying illustrations. Nevertheless, it should be recognized that the preferred embodiments of the invention are not provided to limit the invention but to illustrate it. The present invention can be practiced not only in the preferred embodiments herein mentioned, but also in a wide range of other embodiments besides those explicitly described. Furthermore, the scope of the present invention is expressly not limited to any particular embodiments except what is specified in the appended Claims.

Figure 1:
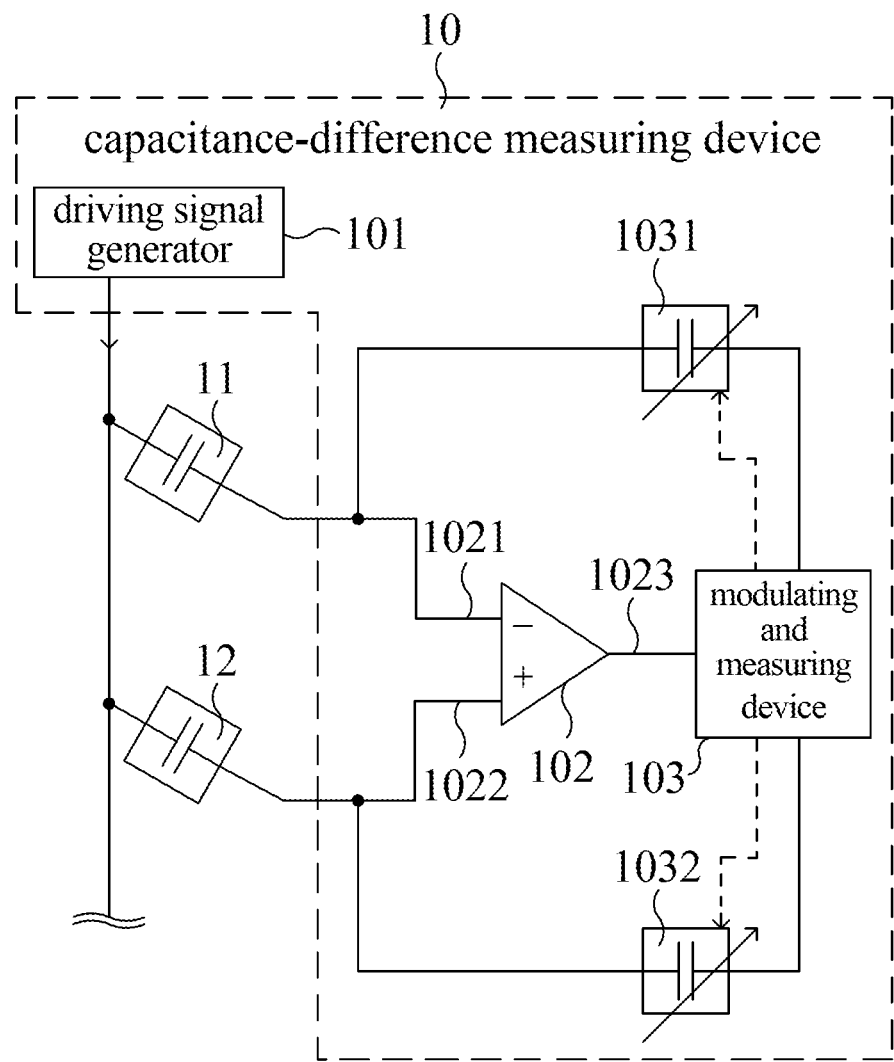
FIG. 1 is a schematic block diagram illustrating a capacitance-difference measuring device according to an embodiment of the present invention.

Please refer to FIG. 1, in which a capacitance-difference measuring device according to an embodiment of the present invention is schematically illustrated. For example, a capacitance difference between a first capacitor 11 and a second capacitor 12 is to be measured. The capacitance-difference measuring device 10 includes a driving signal generator 101, a comparator 102 and a modulating and measuring device 103. The driving signal generator 101 is electrically connected to the first capacitor 11 and the second capacitor 12 for providing a driving signal to the first capacitor 11 and the second capacitor 12 in a measurement period. The comparator 102 has a first input terminal 1021, a second input terminal 1022 and an output terminal 1023, wherein the first input terminal 1021 and the second input terminal 1022 are electrically connected to the first capacitor 11 and the second capacitor 12, and an output signal which is selectively switched between at least a first state and a second state, is generated according to a voltage difference between the first input terminal 1021 and the second input terminal 1022 and outputted from the output terminal 1023. The modulating and measuring device 103 is coupled to the first input terminal 1021, the second input terminal 1022 and the output terminal 1023 of the comparator 102, and generates a first modulating voltage signal and a second modulating voltage signal in the measurement period. The first modulating voltage signal and the second modulating voltage signal are coupled to the first input terminal 1021 and the second input terminal 1022 via a first coupling capacitor 1031 and a second coupling capacitor, respectively, and selectively adjusted by the modulating and measuring device 103. The output of the first modulating voltage signal or the second modulating voltage signal varies with the output signal from the output terminal 1023 of the comparator 102. Meanwhile, a characteristic value is generated. The characteristic value correlates to a length of time from a start point of the measurement period to a specified point corresponding to a specific condition. The specified point, for example, may be a transition point from the first state to the second state of the output signal, or from the second state to the first state of the output signal, and the characteristic value is the length of time from the start point of the measurement period to the transition point of states. In another example, the characteristic value is a ratio of the length of time to the measurement period. The characteristic value further correlates to a capacitance difference between the first capacitor 11 and the second capacitor 12. The comparator 102, for example, may be implemented with an operational amplifier. The first state and the second state of the output signal are a low level state, e.g. 0V, and a high level state, e.g. 3.3V, respectively.

Figure 2A:
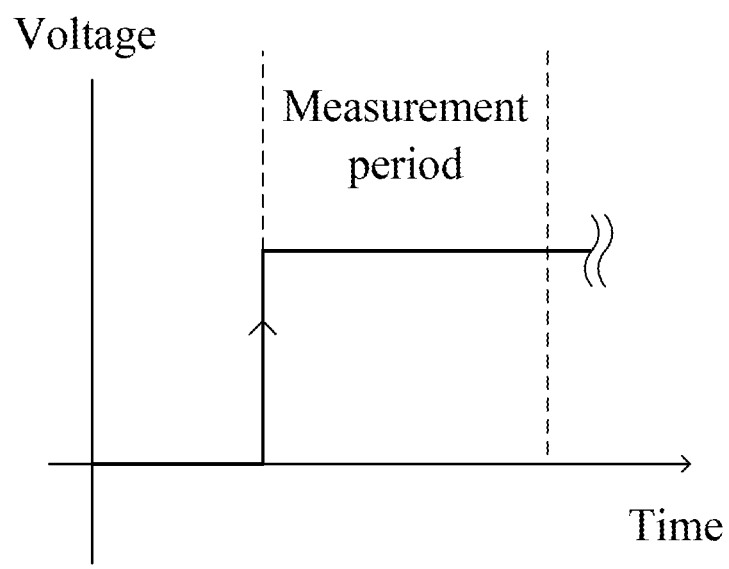
Figure 2B:
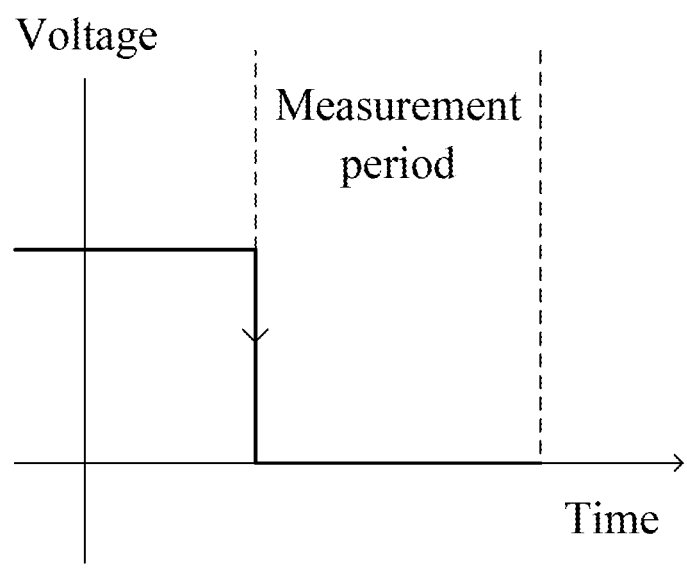

Hereinafter, examples are given for describing the operational details of the capacitance-difference measuring device 10. The driving signal outputted by the driving signal generator 101 in the measurement period may be a charging signal or a discharging signal whose voltage level is transferred from a first level to a second level. FIG. 2A and FIG. 2B schematically exemplify the charging signal and the discharging signal, respectively, with the measurement period being specified. When a capacitance difference exists between the first capacitor 11 and the second capacitor 12, the charging/discharging rate of the two capacitors 11 and 12 under the same charging/discharging driving signal would be different from each other. In other words, the voltage levels of the two capacitors 11 and 12 increase or decrease differentially. Therefore, according to the present invention, by electrically connecting the first input terminal 1021 and the second input terminal 1022 of the comparator 102 to the first capacitor 11 and the second capacitor 12, respectively, an output signal correlating to the voltages of the two capacitors 11 and 12 can be obtained from the output terminal 1023 of the comparator 102. For example, when the voltage level at the first capacitor 11, i.e. the first input terminal 1021, is higher than the voltage level at the second capacitor 12, i.e. the second input terminal 1022, the output signal outputted from the output terminal 1023 will be at a low voltage level. On the other hand, when the voltage level at the second capacitor 12, i.e. the first input terminal 1021, is lower than the voltage level at the second capacitor 12, i.e. the second input terminal 1022, the output signal outputted from the output terminal 1023 will be at a high voltage level.

Figure 2C:
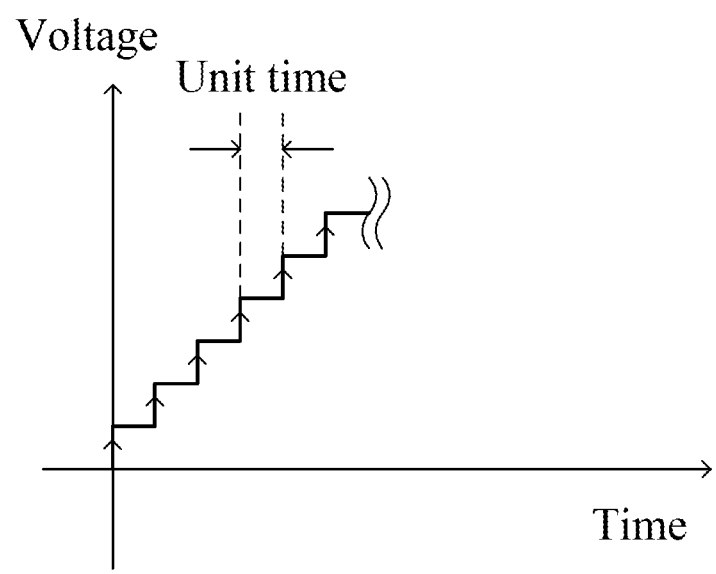
FIG. 2C is a schematic waveform diagram of an embodiment of modulating voltage signal used in a capacitance-difference measuring method according to the present invention.

Then the modulating and measuring device 103 outputs the first modulating voltage signal or the second modulating voltage signal, depending on the state of the output signal, to the associated input terminal. Each of the waveform of the first modulating voltage signal and the waveform of the second modulating voltage signal are exemplified as schematically shown in FIG. 2C. The first modulating voltage signal or the second modulating voltage signal are outputted for adjusting the voltage level at the first capacitor 11, i.e. the first input terminal 1021, or the voltage level at the second capacitor 12, i.e. the second input terminal 1022, until balance or equality of the two voltage levels. When the output signal received by the modulating and measuring device 103 from the output terminal 1023 of the comparator 102 is at a low voltage level, it means that the voltage level at the first capacitor 11, i.e. the first input terminal 1021, is higher than the voltage level at the second capacitor 12, i.e. the second input terminal 1022. Therefore, the modulating and measuring device 103 will adjust the voltage value of the second modulating voltage signal provided to the second input terminal 1022 of the comparator 102 via the second coupling capacitor 1032. The second modulating voltage signal has a waveform as exemplified in FIG. 2C, which shows that the voltage value of the second modulating voltage signal is incrementally changed with one unit of voltage per unit time. In practice, the modulating and measuring device 103 incrementally adjusts the voltage values of the second modulating voltage signal coupled to the second input terminal 1022 until the modulating and measuring device 103 realizes from a state change of the output signal that a crossover between the two voltage values at the two input terminals has occurred. In other words, when the output signal received by the modulating and measuring device 103 becomes a high voltage level, it means that the voltage level at the first capacitor 11, i.e. the first input terminal 1021, becomes lower than the voltage level at the second capacitor 12, i.e. the second input terminal 1022, and it is indicated that the crossover has occurred. Meanwhile, a length of time from a start point of the measurement period to a transition point of the output signal from the low voltage level to the voltage level is recorded. Since the voltage value of the first modulating voltage signal or the second modulating voltage signal increases constantly in this embodiment, the length of time or a ratio of the length of time to the measurement period can be referred to as the characteristic value of the output signal.

Figure 2D:
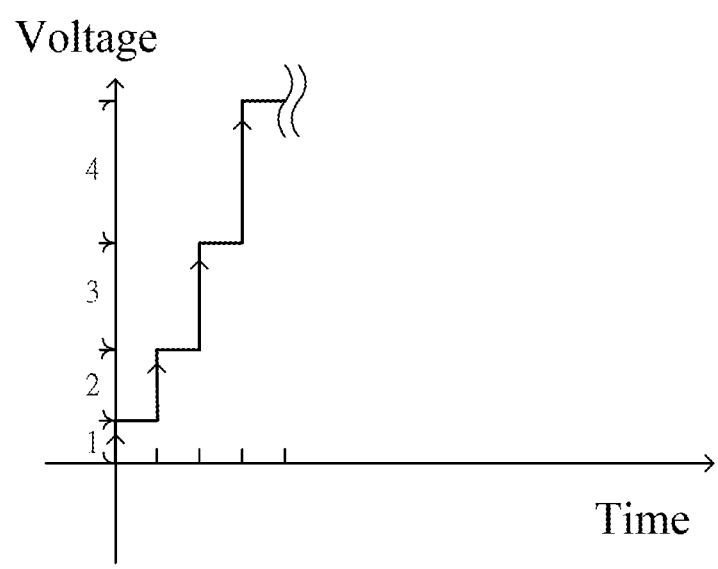
FIG. 2D is a schematic waveform diagram of another embodiment of modulating voltage signal used in a capacitance-difference measuring method according to the present invention.

In another embodiment, the modulating and measuring device 103 still incrementally adjusts the voltage values of the first or second modulating voltage signal coupled to the corresponding input terminal 1021 or 1022 according to the output terminal 1023 of the comparator 102, but the incremental voltage level of the first or second modulating voltage signal per unit time may increase with time. In other words, the incremental voltage level is smaller in the beginning stage of the measurement period and becomes larger and larger with time passing. For example, as shown in FIG. 2D, the voltage of the first or second modulating voltage signal increases with one unit of voltage within the first unit of time, increases with two units of voltage within the second unit of time, and increases with three units of voltage within the third unit of time, and so forth.

The increase of voltage levels may stop when the crossover occurs. Therefore, it is understood that the later the crossover occurs, the more unit time pass, which also indicates that the more the voltage increases, and the greater the capacitance difference between the first capacitor and the second capacitor initially exists. Therefore, by recording the number of unit of voltage change that is added to the voltage of the first or second modulating voltage signal in the last time unit, a characteristic value that correlates to a slope of the first modulating voltage signal or a slope of the second modulating signal can be realized, wherein the slope is defined as a voltage change of the first or second modulating voltage signal with time in the measurement period. It is understood that the characteristic value further correlates to the capacitance difference between the capacitor 11 and the capacitor 12. According to the present invention, recordation of the increased amount of voltage does not have to follow the occurrence of the crossover. In a case that the measurement period times up before the crossover occurs, the last number of unit of voltage change occurring before the measurement period times up may still be recorded to obtain the characteristic value. In a further embodiment, a reconfirming step is performed to remove interference of noises. In the reconfirming step, the measurement of capacitance difference within the measurement period continues until a specified number of crossovers has occurred, i.e. a preset number of stage changes of the output signal has occurred.

In an embodiment of the present invention, the first coupling capacitor 1031 and the second coupling capacitor 1032 are controlled variable capacitors. The modulating and measuring device 103 optionally fine tunes the capacitance of the first coupling capacitor 1031 and the second coupling capacitor 1032 via signal lines, i.e. the dash lines shown in FIG. 1 for speeding up or slowing down the voltage changes at the first input terminal 1021 and the second input terminal 1022. For example, the capacitance of the first coupling capacitor 1031 and the second coupling capacitor 1032 in some beginning unit time may be preset to be different from that in some subsequent unit time. If the capacitance in the beginning unit time is preset to be larger than the capacitance in the subsequent unit time, the voltage values at the first input terminal 1021 and the second input terminal 1022 would be changed more quickly in the beginning unit time while more slowly in the subsequent unit time. In this way, the voltage difference between the two input terminals can be reduced more significantly in the beginning and measured accurately subsequently. Therefore, the detecting time can be efficiently minimized. Of course, the voltage value of the modulating voltage signal can be kept constant and only the capacitance of the first coupling capacitor 1031 or the capacitance of the second coupling capacitor 1032 is adjusted to change the voltage and change rate at the first input terminal 1021 (or the second input terminal 1022) for tracing the voltage change at the second input terminal 1022 (or the first input terminal 1021). Likewise, a length of time from a start point of the measurement period to a specified point that the output signal changes from a high (low) voltage level to a low (high) voltage level is recorded.

The capacitance-difference measuring device and method according to the present invention may be applied to a capacitive touch-sensing panel. Please refer to FIG. 3. M lines of sensing electrodes are formed on a substrate in a first direction, and N lines of sensing electrodes are formed on a substrate in a second direction. The substrate may be implemented with a transparent plate or an opaque circuit board. Each of the M lines of sensing electrodes interacts with each of the N lines of sensing electrodes so as to collectively form M*N sits of crossover regions or adjacent regions. The term "crossover region" is defined, in a case that the M lines of sensing electrodes and the N lines of sensing electrodes are formed in different layers with a dielectric layer clamped therebetween, as a site where one of the M lines of sensing electrodes crosses over or under one of the N lines of sensing electrodes. The term "adjacent region" is defined, in a case that M*N sensing electrode units, each comprising a pair of adjacent electrode portions clamped with a dielectric portion, are formed on the same layer and respectively interconnected to form the M lines of sensing electrodes and the N lines of sensing electrodes, as a site where a pair of adjacent electrode portions is located. In either the crossover region or the adjacent region, an equivalent capacitor is constituted and serves as a touch-sensing region. Under this architecture, a scanning operation is performed on the M*N equivalent capacitors to locate a touching object, e.g. a finger, on the touch-sensing panel according to the scanned capacitance information of the M*N equivalent capacitors. The details will be described hereinafter with reference to examples and Figures.

Figure 3:
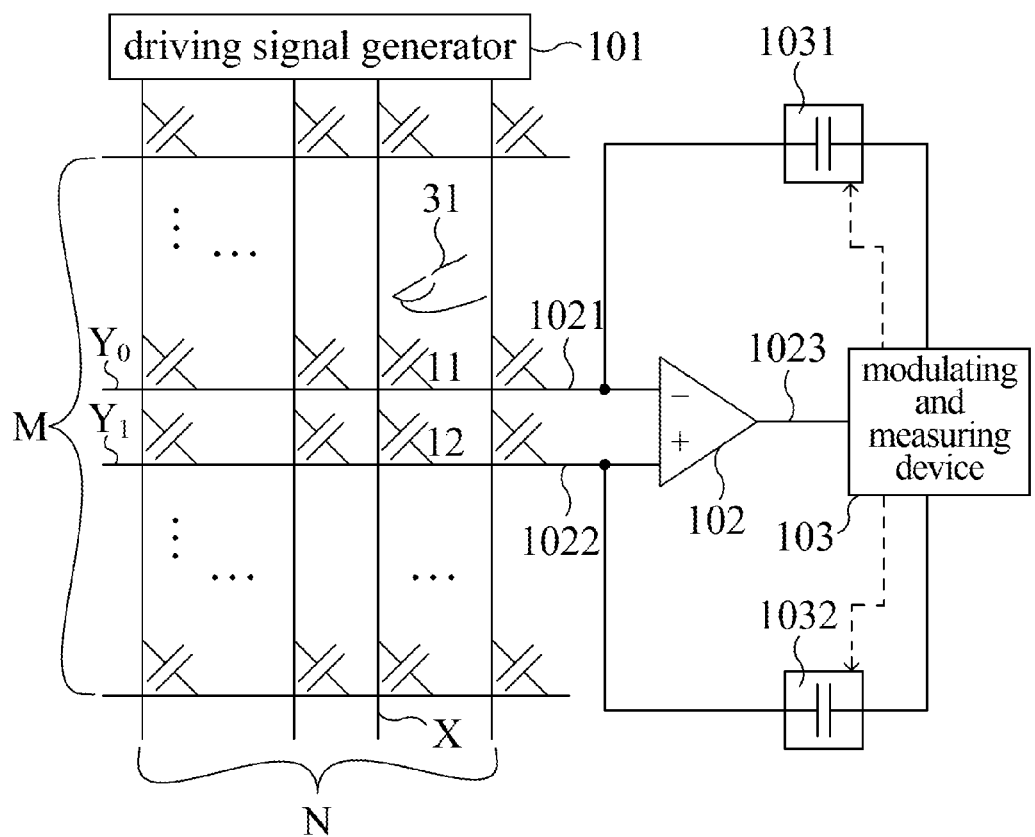
FIG. 3 is a schematic diagram illustrating a touch-sensing circuit to which capacitance-difference measuring method and device according to the present invention are applied.
Figure 4A:
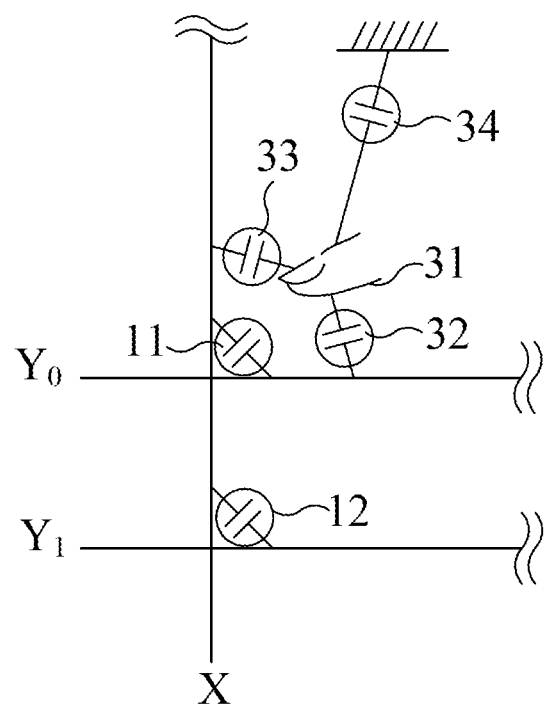
FIG. 4A is a scheme illustrating a capacitance distribution around a touch point on a kind of touch-sensing panel, to which capacitance-difference measuring method and device according to the present invention are applied.

In an example, a finger 31 touches or approaches a specified point on the panel as shown in FIG. 3. Meanwhile, the driving signal generator 101 sequentially outputs a driving signal, which may be a charging signal as illustrated in FIG. 2C or a discharging signal as illustrated in FIG. 2D, to the N lines of sensing electrodes in respective measurement periods. When the first capacitor 11 and the second capacitor 12 in the sensing electrode line X starts to be charged or discharged by the driving signal, since the touched position is nearer to the first capacitor 11 than to the second capacitor 12, the equivalent capacitance of the first capacitor 11 becomes much larger than the equivalent capacitance of the first capacitor 12. The associated equivalent circuit can be referred to FIG. 4A, wherein the finger 31 touching or approaching on the panel can be equivalently regarded as a grounded group of coupling capacitors 32, 33 and 34. In other words, there would be a significant difference between an equivalent capacitance of the crossover or adjacent region defined with the sensing electrode line X and a sensing electrode line Y0 and the grounded group of coupling capacitors and an equivalent capacitance of the crossover or adjacent region defined with the sensing electrode line X and another sensing electrode line Y1. The equivalent capacitance of the crossover or adjacent region defined with the sensing electrode line X and the sensing electrode line Y0 correlates to the capacitance of the initial first capacitor 11 and the capacitance of the finger 31. Therefore, in spite of being driven by the same charging or discharging signal, the charging or discharging speeds of the two capacitors are different, and thus the voltages of the two capacitors rise or descend at different rates. The comparator 102 and the modulating and measuring device 103 measures or specifies the capacitance difference between the two capacitors in each measurement period. After the sequential and continuous scanning operations for the M*N lines of sensing electrodes are completed, a relative capacitance distribution all over the sensing regions can be obtained. According to the relative capacitance distribution, a distribution of one or more touch points with one or more fingers can be realized by associated circuit. The above-described touch-sensing operations and associated circuitry can be implemented with prior art techniques. For example, the double line sensing technique disclosed in US Patent Publication No. 2014/0333575A1 assigned to the same assignee may be applied hereto. The capacitance-difference measuring device and method according to the present invention can be integrated into the touch-sensing techniques to accelerate the measurement of the capacitance difference.

It is to be noted that the term "touch-sensitive" or "touch-sensing" means not only to be sensitive to a sliding or touching gesture actually acting on a specified surface but also sensitive to an air gesture floatingly acting over the specified surface. The air gesture may be a vertically moving action and/or a horizontally moving action within a specified range, or a holding-still action for a specified period of time. Herein, fingers are exemplified as the tool for executing the gestures. However, any other suitable tool capable of conducting a capacitance change may be used depending on practical requirements and size of the touch-sensing electronic device. For example, palms or conductive objects may also be used instead. For large-area touch sensing, a plurality of touch sensing units may be combined to detect a capacitance change so as to effectively enhance the sensitivity and effective sensible distance.

Figure 4B:
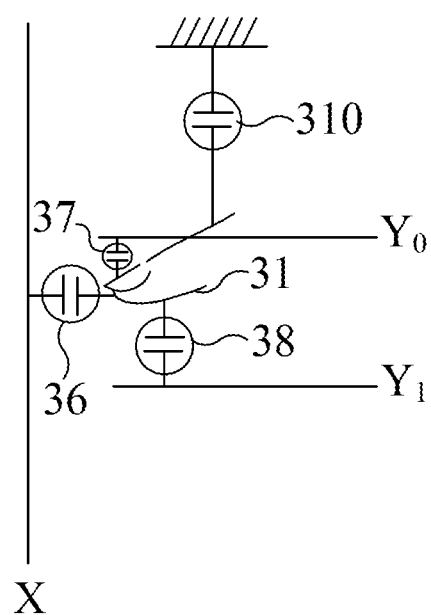
FIG. 4B is a scheme illustrating a capacitance distribution around a touch point on another kind of touch-sensing panel, to which capacitance-difference measuring method and device according to the present invention are applied.

It is to be emphasized that according to the present invention, the capacitance difference can be successfully measured even if the equivalent capacitance in any of the sensing regions is not large enough. Especially in the case that the sensing region is implemented with the adjacent region where the sensing electrodes are formed on the same layer, the equivalent capacitance is relatively small because of the relatively large gap between two sensing electrodes, e.g. electrodes X and Y0 or electrodes X and Y1. If the sensing electrodes are made of relatively low cost silver glue or printed carbon film, the equivalent capacitance is even smaller due to the relatively high resistance of the electrode material. Nevertheless, the capacitance-difference measuring technique according to the present invention still works for quick measurement or recognition of the capacitance difference. The scheme of FIG. 4B illustrates how the present invention works in an example that the equivalent capacitance is relatively small to measure a difference between two equivalent capacitances of the two sensing regions constituted by the sensing electrode X and each of the sensing electrodes Y0 and Y1. In this example, the driving signal generator 101 sequentially outputs a driving signal, which may be a charging signal as illustrated in FIG. 2C or a discharging signal as illustrated in FIG. 2D, to the N lines of sensing electrodes in respective measurement periods. When the sensing electrode line X starts to be charged or discharged by the driving signal, a coupling capacitor 36 between the sensing electrode X and the finger 31, the equivalent grounding capacitor 310 of the finger 31 itself, and coupling capacitors 37 and 38 between the sensing electrode X and each of the sensing electrodes Y0 and Y1 are formed. Accordingly, two equivalent capacitors associated with the sensing electrodes Y0 and Y1, respectively, are obtained. By way of the present capacitance-difference measuring technique, which of the two equivalent capacitors has a larger capacitance can be discriminated with the comparator 102 and the modulating and measuring device 103 of the capacitance-difference measuring device 10. Accordingly, whether the touch point is near the sensing electrode Y0 or the sensing electrode Y1 can be recognized. The above-described touch-sensing operations adopting adjacent regions can be implemented with prior art techniques. For example, US Patent Publication No. 2014/0333575A1 and US Patent Publication No. 2015/0160762A1 assigned to the same assignee may be applied hereto. The capacitance-difference measuring device and method according to the present invention can be integrated into the touch-sensing techniques to accelerate the measurement of the capacitance difference.

Figure 5:
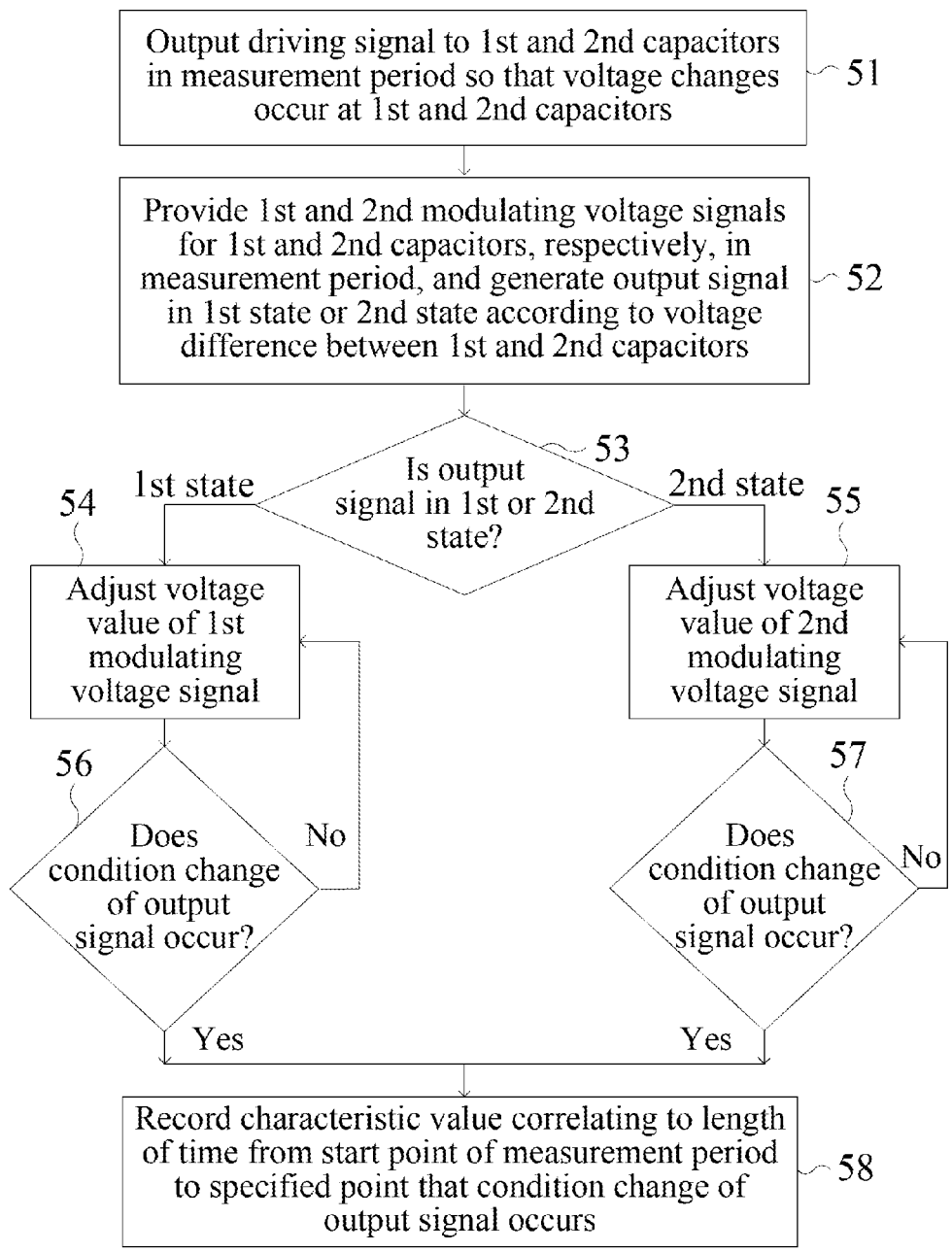
FIG. 5 is a schematic flowchart of a capacitance-difference measuring method according to an embodiment of the present invention.

FIG. 5 schematically illustrates a flowchart of a capacitance-difference measuring method according to an embodiment of the present invention. The capacitance-difference measuring method can be applied to any proper technique or used in any proper device that needs to measure or specify a capacitance difference between two capacitors, and may be further understood with reference to the device as illustrated in FIG. 1. The capacitance-difference measuring method includes: outputting a driving signal to a first capacitor and a second capacitor in a measurement period so that voltage changes occur at the first capacitor and the second capacitor (Step 51); providing a first modulating voltage signal for the first capacitor and providing a second modulating voltage signal for the second capacitor in the measurement period, and generating an output signal in either a first state or a second state according to a voltage difference between the first capacitor and the second capacitor (Step 52); when the output signal is in the first state (Step 53), adjusting a voltage value of the first modulating voltage signal provided for the first capacitor (Step 54), and when the output signal is in the second state (Step 53), adjusting a voltage value of the second modulating voltage signal provided for the second capacitor (Step 55); determining whether a condition of the output signal changes as a result of the adjustment of the first modulating voltage signal (Step 56) or the adjustment of the second modulating voltage signal (Step 57); and when a condition change of the output signal occurs, recording a characteristic value correlating to a length of time from a start point of the measurement period to a specified point that the condition change of the output signal occurs (Step 58). The resulting characteristic value thus correlates to a capacitance difference between the first capacitor and the second capacitor.

For example, the adjustment of the first modulating voltage signal in Step 54 or the adjustment of the second modulating voltage signal in Step 55 may be implemented by constantly increasing the voltage value of the first or second modulating voltage signal, as illustrated in FIG. 2C and its relevant descriptions. The condition change of the output signal, for example, may be a state change from the first state to the second state or from the second state to the first state. In another example, the condition change of the output signal is not determined until the state change occurs a preset number of times.

Figure 6:
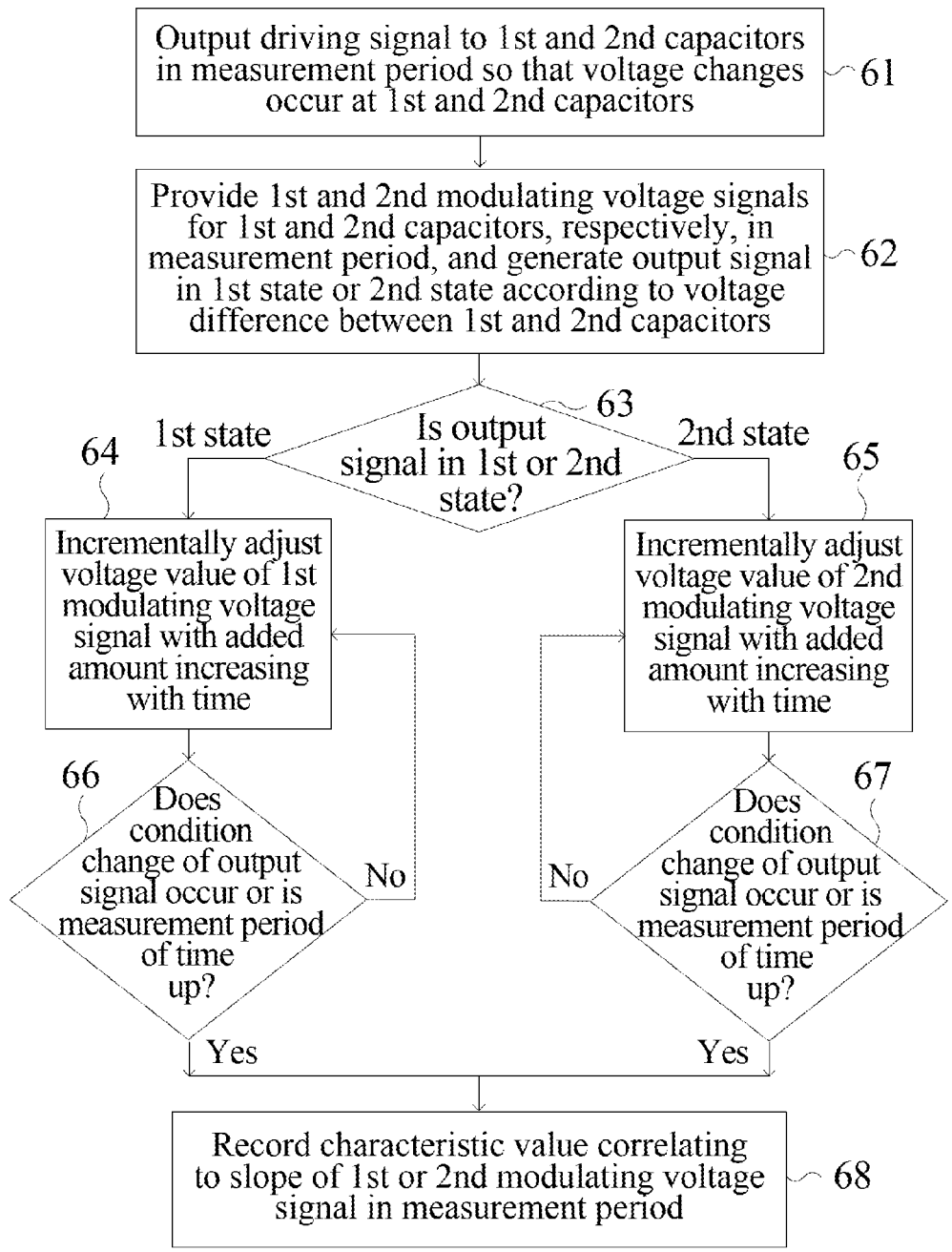
FIG. 6 is a schematic flowchart of a capacitance-difference measuring method according to another embodiment of the present invention.

FIG. 6 schematically illustrates a flowchart of a capacitance-difference measuring method according to another embodiment of the present invention. The capacitance-difference measuring method includes: outputting a driving signal to a first capacitor and a second capacitor in a measurement period so that voltage changes occur at the first capacitor and the second capacitor (Step 61); providing a first modulating voltage signal for the first capacitor and providing a second modulating voltage signal for the second capacitor in the measurement period, and generating an output signal in either a first state or a second state according to a voltage difference between the first capacitor and the second capacitor (Step 62); when the output signal is in the first state (Step 63), incrementally adjusting a voltage value of the first modulating voltage signal provided for the first capacitor with an added amount increasing with time (Step 64), and when the output signal is in the second state (Step 63), incrementally adjusting a voltage value of the second modulating voltage signal provided for the second capacitor with an added amount increasing with time (Step 65); determining whether the condition of the output signal changes as a result of the adjustment of the first modulating voltage or the measurement period timing up (Step 66) or the adjustment of the second modulating voltage or the measurement period timing up (Step 67); and when a condition change of the output signal occurs, recording a characteristic value correlating to a slope of the first modulating voltage signal or a slope of the second modulating signal, wherein the slope is defined as a voltage change of the first or second modulating voltage signal with time in the measurement period (Step 68). The resulting characteristic value thus correlates to a capacitance difference between the first capacitor and the second capacitor. FIG. 2D and its relevant descriptions may be referred to for exemplifying the incremental adjustment of the first or second modulating voltage signal with an added amount increasing with time in Step 64 or Step 65. The condition change of the output signal, for example, may be a state change from the first state to the second state or from the second state to the first state. In another example, the condition change of the output signal is not determined until the state change occurs a preset number of times.

The foregoing descriptions, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention. While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A device for measuring a capacitance difference between a first capacitor and a second capacitor, comprising:

a driving signal generator electrically connected to the first capacitor and the second capacitor for outputting a driving signal to each of the first capacitor and the second capacitor in a measurement period;

a comparator having a first input terminal, a second input terminal and an output terminal, wherein the first input terminal and the second input terminal are electrically connected to the first capacitor and the second capacitor, respectively, and according to a voltage difference between the first input terminal and the second input terminal, an output signal, which is selectively switched between at least a first state and a second state, is outputted from the output terminal; and a modulating and measuring device coupled to the first input terminal, the second input terminal and the output terminal of the comparator, and generates a first modulating voltage signal and a second modulating voltage signal in the measurement period, wherein the first modulating voltage signal and the second modulating voltage signal are coupled to the first input terminal and the second input terminal, respectively, and selectively adjusted according to the output signal, and a characteristic value for indicating a capacitance difference between the first capacitor and the second capacitor is generated as correlating to a length of time from a start point of the measurement period to a specified point that a condition change of the output signal occurs.

2. The device according to claim 1, wherein the driving signal is a charging signal or a discharging signal, whose voltage level is transferred from a first level to a second level, and the first state and the second state of the output signal are a low voltage level and a high voltage level, respectively.

3. The device according to claim 1, wherein the modulating and measuring device incrementally adjusts a voltage value of the first modulating voltage signal with selective one or more units of voltage per unit time when the output signal is in the first state, or incrementally adjusts a voltage value of the second modulating voltage signal with selective one or more units of voltage per unit time when the output signal is in the second state, until a state change of the output signal occurs, and wherein the characteristic value is the length of time from the start point of the measurement period to the specified point that the condition change of the output signal occurs, or the characteristic value is a ratio of the length of time to the measurement period.

4. The device according to claim 1, wherein the condition change is a state change of the output signal from the first state to the second state or from the second state to the first state, or the condition change is a preset number of occurrences of state changes between the first state and the second state.

5. The device according to claim 1, wherein the modulating and measuring device is coupled to the first input terminal and the second input terminal via a first coupling capacitor and a second coupling capacitor, respectively.

6. The device according to claim 5, wherein the first coupling capacitor and the second coupling capacitor are variable capacitors, whose capacitances are optionally fine-tuned to speed up or slow down voltage changes at the first input terminal and the second input terminal.

7. A device for measuring a capacitance difference between a first capacitor and a second capacitor, comprising:

a driving signal generator electrically connected to the first capacitor and the second capacitor for outputting a driving signal to each of the first capacitor and the second capacitor in a measurement period;

a comparator having a first input terminal, a second input terminal and an output terminal, wherein the first input terminal and the second input terminal are electrically connected to the first capacitor and the second capacitor, respectively, and according to a voltage difference between the first input terminal and the second input terminal, an output signal, which is selectively switched between at least a first state and a second state, is outputted from the output terminal; and a modulating and measuring device coupled to the first input terminal, the second input terminal and the output terminal of the comparator, and generates a first modulating voltage signal and a second modulating voltage signal in the measurement period, wherein the first modulating voltage signal and the second modulating voltage signal are coupled to the first input terminal and the second input terminal, respectively, and selectively adjusted according to the output signal, and a characteristic value for indicating a capacitance difference between the first capacitor and the second capacitor is generated as correlating to a slope of the first modulating voltage signal or the second modulating signal, wherein the slope is defined as a voltage change of the first or second modulating voltage signal with time in the measurement period.

8. The device according to claim 7, wherein the driving signal is a charging signal or a discharging signal, whose voltage level is transferred from a first level to a second level, and the first state and the second state of the output signal are a low voltage level and a high voltage level, respectively.

9. The device according to claim 7, wherein the modulating and measuring device incrementally adjusts a voltage value of the first modulating voltage signal with selective one or more units of voltage per unit time when the output signal is in the first state, or incrementally adjusts a voltage value of the second modulating voltage signal with selective one or more units of voltage per unit time when the output signal is in the second state, until a state change of the output signal occurs, wherein the characteristic value is a number of unit of voltage change that is added to the first modulating voltage signal or the second modulating voltage signal in the last unit time before the measurement period times up.

10. The device according to claim 7, wherein the modulating and measuring device is coupled to the first input terminal and the second input terminal via a first coupling capacitor and a second coupling capacitor, respectively.

11. The device according to claim 10, wherein the first coupling capacitor and the second coupling capacitor are variable capacitors, whose capacitances are optionally fine-tuned to speed up or slow down voltage changes at the first input terminal and the second input terminal.

12. A method for measuring a capacitance difference between a first capacitor and a second capacitor with a capacitance-difference measuring device, comprising:

outputting a driving signal to each of the first capacitor and the second capacitor in a measurement period so that voltage changes occur at the first capacitor and the second capacitor;

providing a first modulating voltage signal for the first capacitor and providing a second modulating voltage signal for the second capacitor in the measurement period, and generating an output signal in a first state or an output signal in a second state according to a voltage difference between the first capacitor and the second capacitor; and automatically selecting one of a voltage value of the first modulating voltage signal provided for the first capacitor and a voltage value of the second modulating voltage signal provided for the second capacitor to be adjusted according to the output signal, and generating a characteristic value for indicating a capacitance difference between the first capacitor and the second capacitor, which correlates to a length of time from a start point of the measurement period to a specified point that a condition change of the output signal occurs.

13. The method according to claim 12, wherein the voltage value of the first modulating voltage signal is incrementally adjusted with selective one or more units of voltage per unit time when the output signal is in the first state, or the voltage value of the second modulating voltage signal is incrementally adjusted with selective one or more units of voltage per unit time when the output signal is in the second state, until a state change of the output signal occurs, and wherein the characteristic value is the length of time from the start point of the measurement period to the specified point that the condition change of the output signal occurs, or the characteristic value is a ratio of the length of time to the measurement period.

14. A method for measuring a capacitance difference between a first capacitor and a second capacitor with a capacitance-difference measuring device, comprising:
outputting a driving signal to each of the first capacitor and the second capacitor in a measurement period so that voltage changes occur at the first capacitor and the second capacitor;
providing a first modulating voltage signal for the first capacitor and providing a second modulating voltage signal for the second capacitor in the measurement period, and generating an output signal in a first state or an output signal in a second state according to a voltage difference between the first capacitor and the second capacitor; and
automatically selecting one of a voltage value of the first modulating voltage signal provided for the first capacitor and a voltage value of the second modulating voltage signal provided for the second capacitor to be adjusted according to the output signal, and generating a characteristic value for indicating a capacitance difference between the first capacitor and the second capacitor, which correlates to a slope of the first modulating voltage signal or the second modulating signal, wherein the slope is defined as a voltage change of the first or second modulating voltage signal with time in the measurement period.

15. The method according to claim 14, wherein the modulating and measuring device incrementally adjusts a voltage value of the first modulating voltage signal with selective one or more units of voltage per unit time when the output signal is in the first state, or incrementally adjusts a voltage value of the second modulating voltage signal with selective one or more units of voltage per unit time when the output signal is in the second state, until a state change of the output signal occurs, wherein the characteristic value is a number of unit of voltage change that is added to the first modulating voltage signal or the second modulating voltage signal in the last unit time before the measurement period times up.

* * * * *